US012409991B2

(12) United States Patent
Xia

(10) Patent No.: US 12,409,991 B2
(45) Date of Patent: Sep. 9, 2025

(54) STORAGE DEVICE

(71) Applicant: Electronic Silk Road (Shenzhen) Tech Co., Ltd., Guangdong (CN)

(72) Inventor: Zhigang Xia, Guangdong (CN)

(73) Assignee: Electronic Silk Road (Shenzhen) Tech Co., Ltd., Shenzhen (CN)

( * ) Notice: Subject to any disclaimer, the term of this patent is extended or adjusted under 35 U.S.C. 154(b) by 84 days.

(21) Appl. No.: 18/237,908

(22) Filed: Aug. 25, 2023

(65) Prior Publication Data

US 2024/0327084 A1 Oct. 3, 2024

(30) Foreign Application Priority Data

Mar. 29, 2023 (CN) ......................... 202320746551.7
Jun. 7, 2023 (CN) ......................... 202321446853.9

(51) Int. Cl.
*B65D 55/02* (2006.01)
*B65D 13/00* (2006.01)
*H01F 7/02* (2006.01)

(52) U.S. Cl.
CPC ............ *B65D 55/02* (2013.01); *B65D 13/00* (2013.01); *B65D 2255/00* (2013.01); *B65D 2313/04* (2013.01); *H01F 7/0263* (2013.01)

(58) Field of Classification Search
CPC ........................... B65D 55/02; B65D 2255/00; B65D 2313/04; B65D 13/00; H01F 7/0263; E05B 15/0073; E05B 47/0038; E05B 47/004; E05B 73/0017; E05B 73/0023
USPC ........................... 206/320, 1.5; 70/63, 69, 58
See application file for complete search history.

(56) References Cited

U.S. PATENT DOCUMENTS

2011/0215683 A1* 9/2011 Nakasuji ............. E05B 73/0023 312/107
2021/0029424 A1* 1/2021 Wright ................. H04R 1/1025
2021/0230900 A1* 7/2021 Swartz .................... E05C 19/16

FOREIGN PATENT DOCUMENTS

CN 110417089 * 11/2019

* cited by examiner

*Primary Examiner* — Rafael A Ortiz

(57) ABSTRACT

Disclosed is a storage device, including a first protective shell and a second protective shell for enclosing a peripheral side of an object that needs to be stored, and a locking member and an auxiliary unlocking member. The auxiliary unlocking member is configured to move along a shell surface of the first protective shell or move inside and outside towards the first protective shell to resist a locking force of the locking member. The locking member which can meet the locking and unlocking requirements of two protective shells cooperated with the auxiliary unlocking member which can adjust the locking force or locking state between two protective shells to reduce the difficulty of unlocking two protective shells. Therefore, the storage device can be used to reasonably and effectively store and protect the earphone charging compartment, or other products that are small in size and have a smooth and rounded appearance.

7 Claims, 6 Drawing Sheets

STORAGE DEVICE

CROSS REFERENCE TO RELATED APPLICATIONS

The present application claims priorities of Chinese Patent Application No. 202320746551.7 filed on Mar. 29, 2023 and No. 202321446853.9 filed on Jun. 7, 2023, the entire contents of which are hereby incorporated by reference.

TECHNICAL FIELD

The present application relates to the technical field of packaging, and in particular relates to a storage device.

BACKGROUND

The earphone charging compartment is a protective case that can be used to store and charge earphones.

Base on people's usage habits, the earphone charging compartment can also be protected. For example, using a charging compartment protective case to enclose the earphone charging compartment can prevent problems such as wear and loss, and can also prevent the earphone charging compartment from being opened due to misoperation.

Similar to the function of the earphone charging compartment, the charging compartment protective case not only has storage function, but also has locking function. The common locking function of the charging compartment protective case can be achieved by magnetic attraction members or buckle members. However, if the locking force of the charging compartment protective case is large, it means that unlocking the charging compartment protective case is difficult. Moreover, due to the smooth and rounded appearance of the charging compartment protective case, it further increases the difficulty of unlocking. On the contrary, if the locking force of the charging compartment protection case is small, this makes it difficult to effectively protect the earphone charging compartment, resulting in a flashy protective case for the charging compartment.

It can be seen that the common charging compartment protective case on the market is either locked too tightly or too loosely, which does not utilize the charging compartment protective case to effectively store and protect the earphone charging compartment.

SUMMARY

The objective of the present application is to provide a storage device, which has the advantages of achieving tightly locking and reducing the difficulty of unlocking.

To achieve the above objective, the present application provides a storage device, including: a first protective shell and a second protective shell for enclosing a peripheral side of an object that needs to be stored; and a locking member and an auxiliary unlocking member are arranged between the first protective shell and the second protective shell, wherein the auxiliary unlocking member is configured to move along a shell surface of the first protective shell or move towards the inside and outside of the first protective shell to resist a locking force of the locking member.

In some embodiments of the present application, the locking member includes a plurality of magnets; all the magnets are arranged in the first protective shell and the second protective shell, wherein the magnets arranged in the first protective shell are side-by-side distributed and have alternating magnetic poles, wherein the magnets arranged in the second protective shell are side-by-side distributed and have alternating magnetic poles; at least a portion of the magnets arranged in the first protective shell are paired with at least a portion of the magnets arranged in the second protective shell; the auxiliary unlocking member is connected to and is able to drive all the magnets arranged in the second protective shell to slide along a side-by-side distributed direction at least a distance of a single said magnet.

In some embodiments of the present application, the side-by-side distributed direction is within a shell surface of the second protective shell.

In some embodiments of the present application, the auxiliary unlocking member includes a sliding block and an elastic reset member; the elastic reset member is arranged between the sliding block and the second protective shell, and is used to drive the sliding block to move so that multiple magnets will attract each other.

In some embodiments of the present application, two adjacent ends of any pair of the magnets are adjacent and separated from each other.

In some embodiments of the present application, a maximum movement distance of the auxiliary unlocking member is equal to the size on the side-by-side distributed direction of a single said magnet; two ends of a range of the movement distance of the auxiliary unlocking member correspond to multiple pairs of said magnets attracting each other and multiple pairs of said magnets repelling each other respectively.

In some embodiments of the present application, all the magnets arranged in the second protective shell are integrated into a second iron sheet, wherein the auxiliary unlocking member is connected to the second iron sheet.

In some embodiments of the present application, the first protective shell and the second protective shell are both hard shells; the object that needs to be stored is an carphone charging compartment; the locking force applied by the locking member between the first protective shell and the second protective shell is greater than the locking force of the carphone charging compartment.

In some embodiments of the present application, the first protective shell and the second protective shell are assembled to form a protective case; the locking member and one end of the auxiliary unlocking member are both encapsulated in the protective case, and the other end of the auxiliary unlocking member extends out of the protective case.

In some embodiments of the present application, the first protective shell is provided with a first locking buckle, and the auxiliary unlocking member is provided with a second locking buckle; a connection direction of the first locking buckle and the second locking buckle is the same as an opening and closing direction of the first protective shell and the second protective shell; the first locking buckle and the second locking buckle are connected to each other when the auxiliary unlocking member is in an initial locking position, and are separated from each other when the auxiliary unlocking member disengages from the initial locking position; the magnet of the first protective shell and the magnet of the second protective shell attract each other with opposite poles when the auxiliary unlocking member is in the initial locking position.

Compared with existing background technology, the present application provides a storage device, including: a first protective shell and a second protective shell for enclosing a peripheral side of an object that needs to be stored; a locking member and an auxiliary unlocking member arranged between the first protective shell and the second protective shell; wherein the auxiliary unlocking member is configured to move along a shell surface of the first protective shell or move inside and outside towards the first protective shell to resist a locking force of the locking member.

The locking member can provide locking and unlocking functions to the first protective shell and the second protective shell, and the auxiliary unlocking member can resist the locking force of the locking member when moving relative to the first protective shell and the second protective shell. Therefore, the locking force or locking state between the first protective shell and the second protective shell can be adjusted, so as to easily and quickly unlock the first protective shell and the second protective shell. It can be seen that in the storage device provided in this application, the locking member and the auxiliary unlocking member cooperate with each other, which can not only meet the locking and unlocking requirements of the first protective shell and the second protective shell, but also reduce the unlocking difficulty of the first protective shell and the second protective shell, taking into account the locking effect and unlocking performance. It is particularly suitable for products such as earphone charging compartments that are small in size and have a smooth and rounded appearance, and meets the requirements of users.

BRIEF DESCRIPTION OF THE DRAWINGS

In order to more clearly illustrate the embodiments of the present application, the drawings used in the embodiments will be briefly described below. Obviously, the drawings in the following description are merely some embodiments of the present application, and other drawings may be obtained by those skilled in the art without any creative work.

REFERENCE NUMERALS IN THE DRAWINGS

1. first protective shell; 2. second protective shell; 3. magnets; 4. sliding block; 5. second iron sheet; 61. first locking buckle; 62. second locking buckle; 7. first iron sheet; and 8. spring.

DETAILED DESCRIPTION

The technical proposals in the embodiments of the present disclosure will be clearly and completely described in conjunction with the accompanying drawings in the embodiments of the present disclosure. It is apparent that the described embodiments are merely part of the embodiments of the present disclosure rather than all embodiments. Based on the embodiments of the present disclosure, all other embodiments obtained by those skilled in the art without creative work fall within the scope of protection of the present disclosure.

Further detailed description will be provided below in conjunction with the accompanying drawings and specific implementation methods in order to enable those skilled in the art to better understand the present disclosure.

Figure 1:
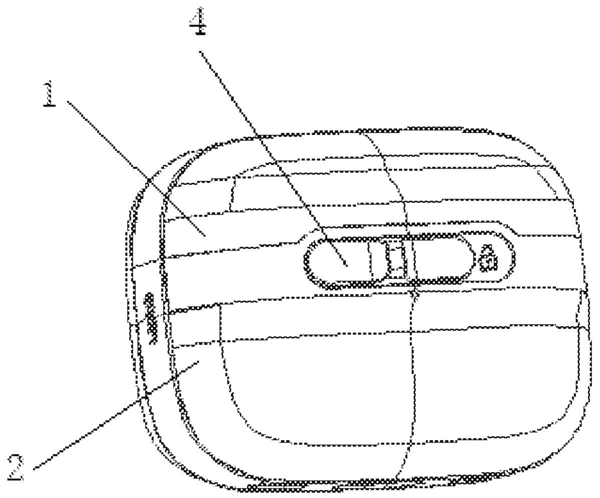
FIG. 1 is a structural schematic diagram of a storage device according to an embodiment of the present application.
Figure 2:
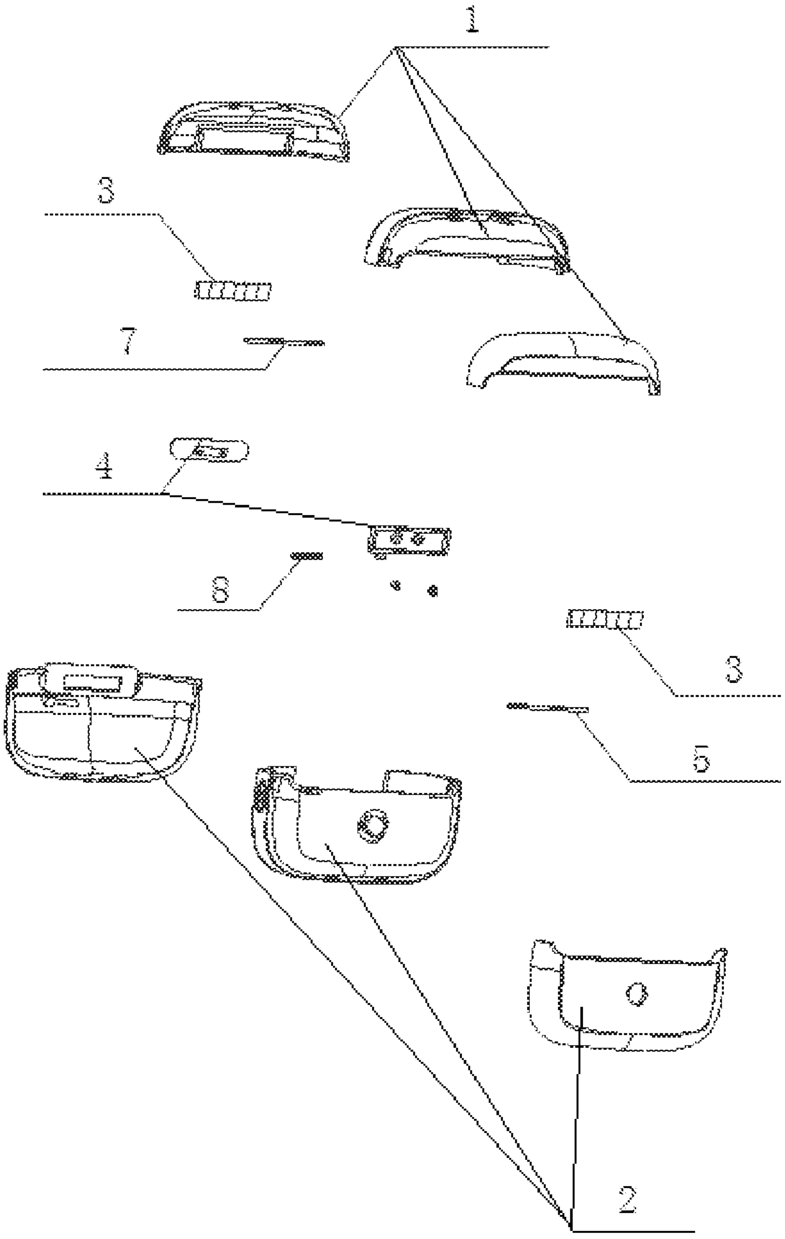
FIG. 2 is an exploded view of the storage device according to the embodiment of the present application.
Figure 3:
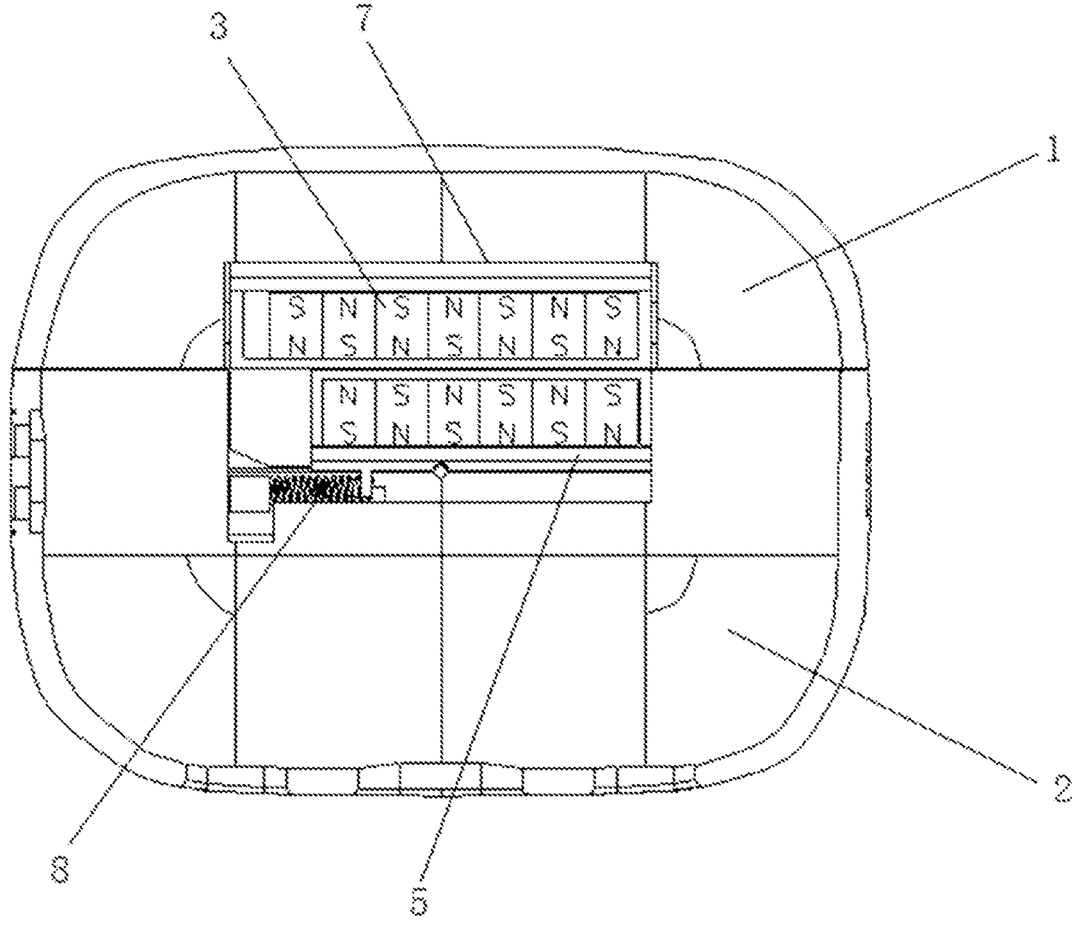
FIG. 3 is a sectional view of the storage device in a locked state according to a first embodiment of the present application.
Figure 4:
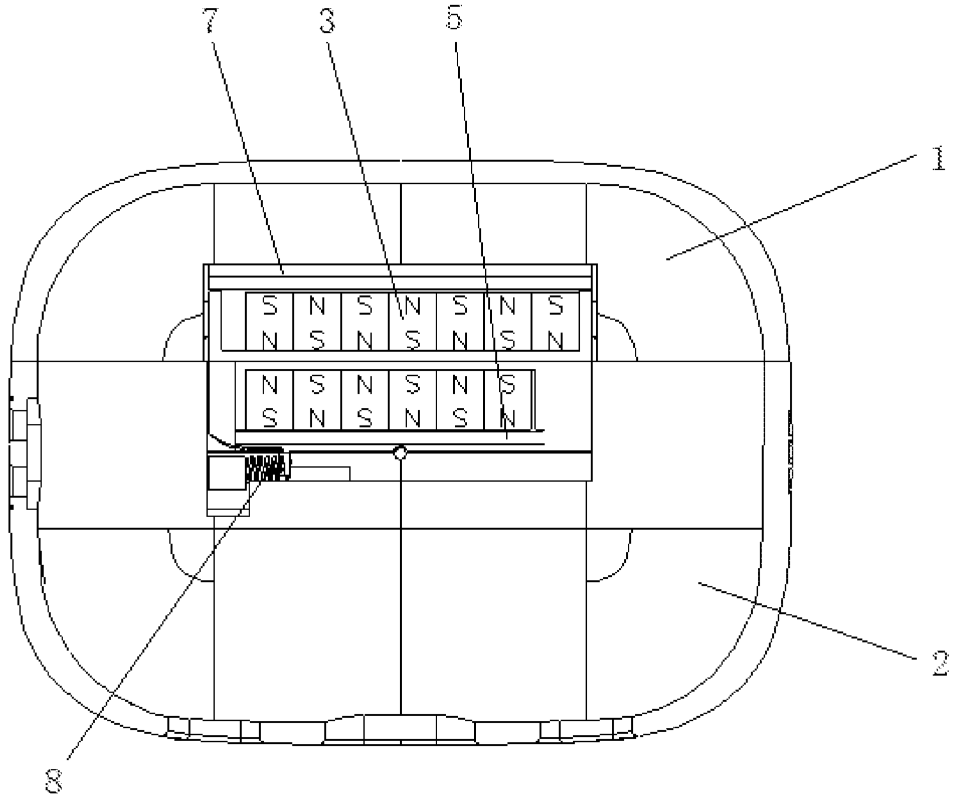
FIG. 4 is a sectional view of the storage device in an unlocked state according to the first embodiment of the present application.
Figure 5:
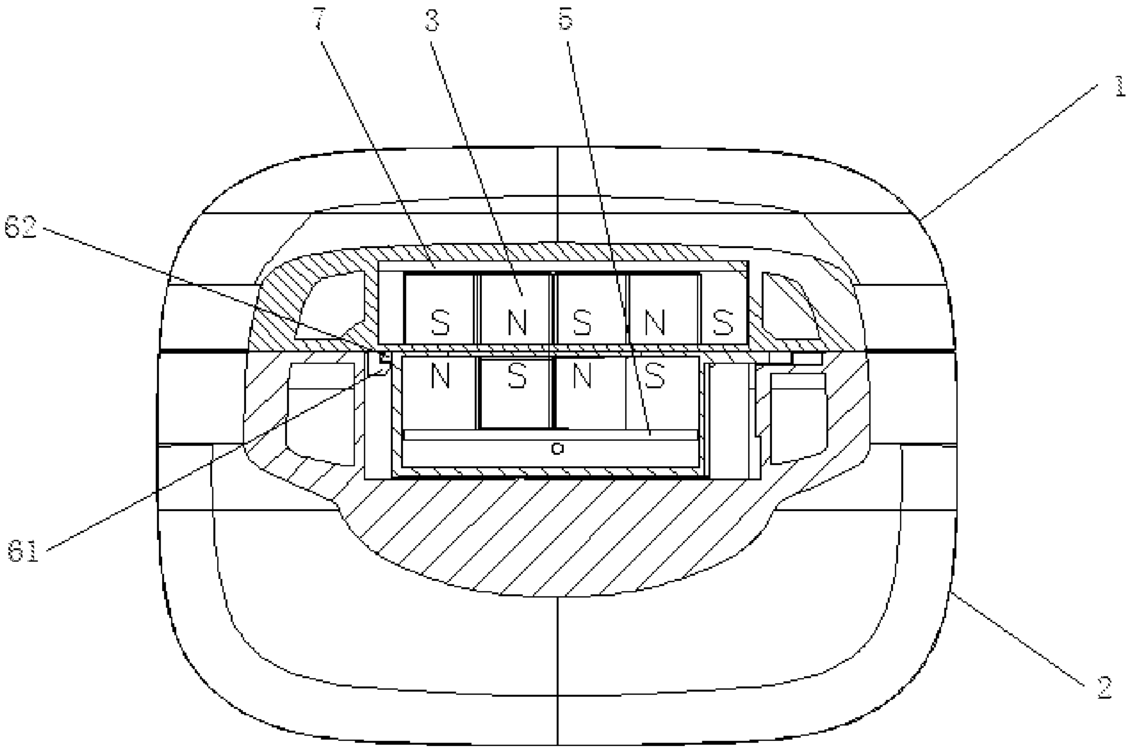
FIG. 5 is a sectional view of the storage device in a locked state according to a second embodiment of the present application.
Figure 6:
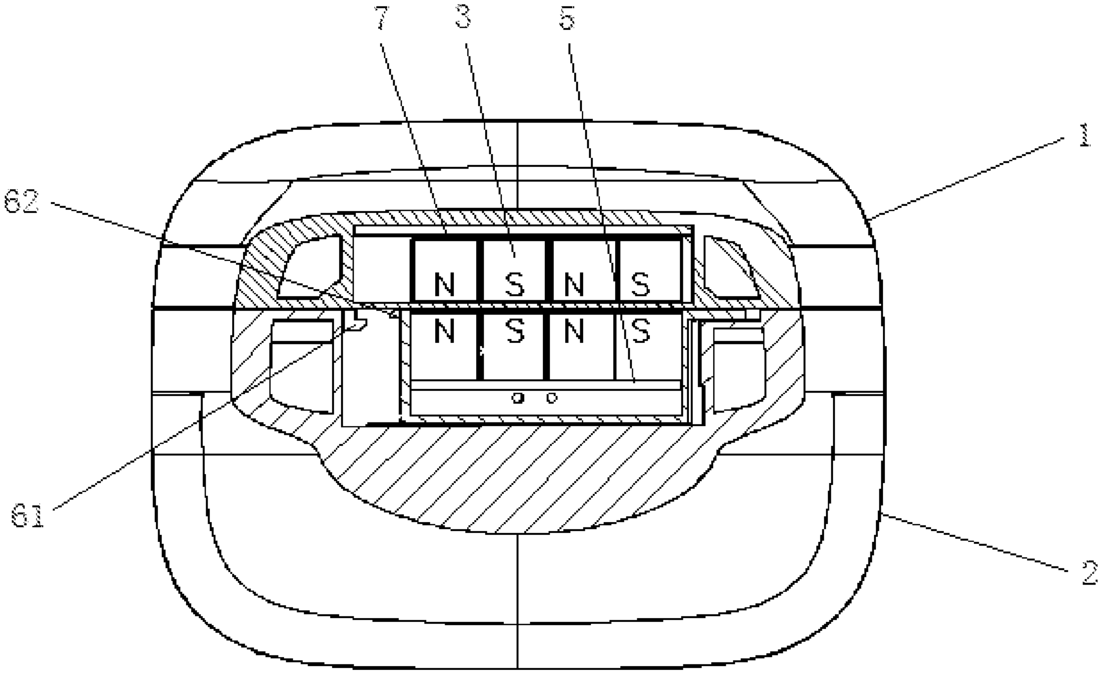
FIG. 6 is a sectional view of the storage device in an unlocked state according to the second embodiment of the present application.

Referring to FIG. 1 to FIG. 6, FIG. 1 is a structural schematic diagram of the storage device provided by an embodiment of the present application; FIG. 2 is an exploded view of the storage device provided by the embodiment of the present application; FIG. 3 is a sectional view of the first storage device in a locked state provided in the embodiment of the present application; FIG. 4 is another sectional view of the first storage device in an unlocked state provided in the embodiment of the present application; FIG. 5 is a sectional view of the second storage device in a locked state provided in the embodiment of the present application; FIG. 6 is another sectional view of the second storage device in an unlocked state provided in the embodiment of the present application.

Referring to FIG. 1 and FIG. 2, the present application provides a storage device, including a first protective shell 1, a second protective shell 2, a locking member and an auxiliary unlocking member; the first protective shell 1 and the second protective shell 2 is used to enclose a peripheral side of an object that needs to be stored, in other words, the first protective shell 1 and the second protective shell 2 can be assembled to form a protective case that encloses the object that needs to be stored. The protective case applies a direct protective effect on the object that needs to be stored, while applies an indirect protective effect on the earphone inside the object that needs to be stored; the locking member and the auxiliary unlocking member are both arranged between the first protective shell 1 and the second protective shell 2. The locking member is used to lock and unlock the first protective shell 1 and the second protective shell 2. The auxiliary unlocking member is configured to move along a shell surface of the first protective shell 1 or move towards the inside and outside of the first protective shell 1 to resist a locking force of the locking member.

In this embodiment, it utilizes locking member to lock and unlock the first protective shell 1 and the second protective shell 2. When the locking member locks the first protective shell 1 and the second protective shell 2, the protective case formed by the assembling of the first protective shell 1 and the second protective shell 2 is in a closed state, which can protect the objects to be stored inside the protective case; when the locking member unlocks the first protective shell 1 and the second protective shell 2, the protective case formed by the assembling of the first protective shell 1 and the second protective shell 2 is in an open state, which users can put the object to be stored into the protective case and take out the object to be stored from the protective case.

In this embodiment, it can utilize locking member with different structural and functional principles to lock and unlock the first protective shell 1 and the second protective shell 2. For example, this embodiment can use the magnetic attraction principle to lock and unlock the first protective shell 1 and the second protective shell 2. Correspondingly, the locking member refers to a magnetic member arranged between the first protective shell 1 and the second protective shell 2; this embodiment can also use the buckle principle to lock and unlock the first protective shell 1 and the second protective shell 2. Correspondingly, the locking member refers to the buckle arranged between the first protective shell 1 and the second protective shell 2. Furthermore, locking member can also have other structural and functional principles.

In this embodiment, it utilizes an auxiliary unlocking member to achieve auxiliary unlocking of the locking member. The auxiliary unlocking member can resist the locking force of the locking member. For locking member that utilize different functional principles, the meaning of the auxiliary unlocking member achieving resistance to the locking force of the locking member is different. For example, for locking member that utilize the buckle principle to achieve locking and unlocking, the auxiliary unlocking member resisting the locking force of the locking member refers to reducing the locking force of the locking member when unlocking the locking member, while for locking member that utilize the principle of magnetic attraction to achieve locking and unlocking, auxiliary unlocking member resisting the locking force of the locking member refers to changing the relationship of the magnetic field when unlocking the locking member, adjusting the magnetic attraction state of the magnetic member to the magnetic repulsion state of the magnetic member. Although this can also be understood as reducing the locking force of the locking member, this reduction is a qualitative change, which is significantly different from the locking member that utilize the buckle principle to achieve locking and unlocking.

In this embodiment, the auxiliary unlocking member is able to move along the shell surface of the first protective shell 1 or move towards the inside and outside of the first protective shell 1, and is provided for adjusting the position of the locking member arranged in the first protective shell 1, so as to improve the force relationship of the entire locking member and achieve resistance to the locking force of the locking member. Taking the locking member based on the buckle principle and the locking member based on the magnetic attraction principle as examples, for the locking member based on the buckle principle, the auxiliary unlocking member can push one of the buckle structures in the buckle structures pair towards the unlocking direction; this can reduce the locking force between the buckle structures, which makes it convenient for users to grasp and pull reversely the first protective shell 1 and second protective shell 2 with both hands, so as to unlock and separate the first protective shell 1 and the second protective shell 2; for the locking member based on the magnetic attraction principle, the auxiliary unlocking member is able to drive partial of the magnetic members in the paired magnetic members to shift, causing the magnetic members that were originally in a magnetic attraction state to become a magnetic repulsion state. It is almost no pulling reversely needed to quickly separate the first protective shell 1 and the second protective shell 2.

The storage device provided in this application can be used to store the carphone charging compartment, which means that the objects to be stored mentioned above can specifically refer to the carphone charging compartment.

In summary, the storage device provided in this application is a device that can provide storage and protective effects for the object that needs to be stored, such as the carphone charging compartment. The locking member and the auxiliary unlocking member cooperate with each other, which can not only meet the locking and unlocking requirements of the first protective shell 1 and the second protective shell 2, but also reduce the unlocking difficulty of the first protective shell 1 and the second protective shell 2. It is particularly suitable for products that are small in size and have a smooth and rounded appearance.

The storage device provided in this application will be further described in conjunction with the accompanying drawings and implementation methods.

Referring to FIG. 2 to FIG. 4, in some embodiments, the locking member utilizes the magnetic attraction principle and can include several magnets 3, which are arranged separately in the first protective shell 1 and the second protective shell 2; the magnets 3 arranged in the first protective shell 1 are side-by-side distributed and have alternating magnetic poles, and the magnets 3 arranged in the second protective shell 2 are side-by-side distributed and have alternating magnetic poles; at least a portion of the magnets 3 arranged in the first protective shell 1 are paired with at least a portion of the magnets 3 arranged in the second protective shell 2.

Wherein, "at least a portion of the magnets 3 arranged in the first protective shell 1 are paired with at least a portion of the magnets 3 arranged in the second protective shell 2" can not only refer to all the magnets 3 arranged in the first protective shell 1 and all the magnets 3 arranged in the second protective shell 2 being one-to-one corresponding related, which exactly form multiple pairs of magnets 3, but also can refer to the fact that the number of the magnets 3 arranged in the first protective shell 1 is greater than the number of the magnets 3 arranged in the second protective shell 2, wherein some magnets 3 in the first protective shell 1 correspond one-to-one with all magnets 3 in the second protective shell 2, so as to form multiple pairs of magnets 3.

In the above embodiment, the locking member can firmly and reliably lock the first protective shell 1 and the second protective shell 2 when multiple magnets 3 arranged in the first protective shell 1 and multiple magnets 3 arranged in the second protective shell 2 exhibit opposite magnetic polarity alignment; on the contrary, the locking member can easily unlock the first protective shell 1 and the second protective shell 2 when all magnets 3 arranged in the first protective shell 1 and all magnets 3 arranged in the second protective shell 2 exhibit same magnetic polarity alignment.

The auxiliary unlocking member mentioned in the above embodiment can be connected to all magnets 3 arranged in the first protective shell 1, or be connected to all magnets 3 arranged in the second protective shell 2. The user drives the auxiliary unlocking member to move along the shell surface of the first protective shell 1 or move inside and outside towards the first protective shell 1, causing all magnets 3 arranged in the first protective shell 1 and all magnets 3 arranged in the second protective shell 2 to change corresponding alignment relationship of the magnetic pole.

Generally, the range of the auxiliary unlocking member mentioned above moving along the shell surface of the first protective shell 1 or moving inside and outside towards the first protective shell 1 is not less than a distance of one magnet 3, ensuring that all magnets 3 arranged in the first protective shell 1 and all magnets 3 arranged in the second protective shell 2 can be staggered by a distance of at least one magnet 3 by the traction of the auxiliary unlocking member, thereby achieving a transformation from the opposite magnetic poles completely opposite distributed to the same magnetic poles completely opposite distributed.

All magnets 3 arranged in the first protective shell 1 can be side-by-side distributed along the shell surface of the first protective shell 1 when applying this storage device to products such as carphone charging compartment, in order to arrange multiple magnets 3 reasonably in a limited space since the carphone charging compartment considering to be relatively small and the storage device is also generally small. Similarly, all magnets 3 arranged in the second protective shell 2 can be side-by-side distributed along the shell surface of the first protective shell 1. Briefly, the side-by-side distributed direction of magnet 3 is within the shell surfaces of the first protective shell 1 and the second protective shell 2. Correspondingly, the auxiliary unlocking member is able to move along the shell surfaces of the first protective shell 1 and the second protective shell 2 to avoid occupying the shell cavity space of the first protective shell 1 and the second protective shell 2.

In some embodiments, the auxiliary unlocking member can specifically include a sliding block 4 and an elastic reset member, wherein the elastic reset member is arranged between the sliding block 4 and the second protective shell 2, which can drive the sliding block 4 to move so that multiple magnets 3 will attract each other. It can be seen that the user can manually manipulate the sliding block 4 to move, causing multiple magnets 3 to repel each other, thereby unlocking the first protective shell 1 and the second protective shell 2. Once the user no longer applies force to the auxiliary unlocking member, the elastic reset member automatically pulls the sliding block 4 to move, causing multiple magnets 3 to return to their original positions, wherein the elastic reset member can be a spring 8.

If the first protective shell 1 and the second protective shell 2 are in a closed state when the elastic reset member automatically pulls the sliding block 4 and magnet 3 to reset, multiple magnets 3 return to the attracted state, thereby achieving automatic locking of the first protective shell 1 and the second protective shell 2. If there is a large gap between the first protective shell 1 and the second protective shell 2 at the installation position of the magnet 3, multiple magnets 3 will not generate magnetic attraction, and the first protective shell 1 and the second protective shell 2 are still in a separated state that users can easily take out and place the carphone charging compartment.

In some embodiments, two adjacent ends of any pair of the magnets 3 are adjacent and separated from each other, and the attractive force, repulsive force, and frictional force between magnets 3 are reasonably controlled, facilitating users to adjust the alignment relationship between the pairs of magnets 3 through auxiliary unlocking members.

Based on the above embodiments, a maximum movement distance of the auxiliary unlocking member is equal to the size on the side-by-side distributed direction of a single said magnet 3. At the same time, one end of a movement range of the auxiliary unlocking member corresponds to multiple pairs of magnets 3 attracting each other, and the other end of the movement range of the auxiliary unlocking member corresponds to multiple pairs of magnets 3 repelling each other. In other words, before the user manipulates the auxiliary unlocking member, all magnets 3 arranged in the first protective shell 1 and all magnets 3 arranged in the second protective shell 2 are perfectly aligned and magnetically attracted to each other. When the user manipulates the auxiliary unlocking member to move, the maximum movement distance of the auxiliary unlocking member is equal to the size on the side-by-side distributed direction of a single said magnet 3. Once the user manipulates the auxiliary unlocking member to move said distance, all magnets 3 arranged in the first protective shell 1 and all magnets 3 arranged in the second protective shell 2 are aligned exactly and magnetically repel each other.

Referring to FIG. 3 and FIG. 4, in order to simplify positioning process of several magnets 3 on the first protective shell 1 and the second protective shell 2 during installation, in some embodiments, the first protective shell 1 can be provided with a first iron sheet 7, and the second protective shell 2 can be provided with a second iron sheet 5. The entire magnet 3 arranged in the first protective shell 1 can be integrated and installed on the first iron sheet 7, and all magnets 3 arranged in the second protective shell 2 can be integrated and installed on the second iron sheet 5. In addition, in this embodiment, the auxiliary unlocking member can be connected to the second iron sheet 5, so as to achieve the connection of the auxiliary unlocking member to all magnets 3 arranged in the second protective shell 2.

The first protective shell 1 and the second protective shell 2 can generally be provided as hard shells when applying the storage devices provided in the above embodiments to the carphone charging compartment, and the locking member is arranged between the first protective shell 1 and the second protective shell 2, and the locking force applied between the first protective shell 1 and the second protective shell 2 by the locking member is greater than the locking force of the earphone charging compartment. For example, if the carphone charging compartment utilizes the magnetic attraction principle to lock and unlock, and the locking member between the first protective shell 1 and the second protective shell 2 also utilizes the magnetic attraction principle to lock and unlock, the magnetic attractive force of the magnetic attraction member arranged in the carphone charging compartment can be considered as F1, and the magnetic attractive force of the locking member arranged between the first protective shell 1 and the second protective shell 2 can be considered as F2, then F2 is greater than F1, ensuring that the first protective shell 1 and second protective shell 2 can provide effective protection for the carphone charging compartment.

In all the embodiments provided above, both the first protective shell 1 and the second protective shell 2 can be assembled to form a protective case, wherein the locking member and one end of the auxiliary unlocking member are both encapsulated inside the protective case, while the other end of the auxiliary unlocking member extends out of the protective case, making it convenient for the users to press and manipulate. The shell surface of the protective case can be provided with a flip cover, which can be used to cover the sliding block 4.

In addition, referring to FIG. 2, FIG. 5 and FIG. 6, based on some embodiments provided above, the storage device is also provided with a first locking buckle 61 and a second locking buckle 62 for interlocking with each other; the first locking buckle 61 and the second locking buckle 62 are arranged between the first protective shell 1 and the second protective shell 2, and the first locking buckle 61 and the second locking buckle 62 are respectively connected to the first protective shell 1 and the auxiliary unlocking member. For example, the first locking buckle 61 is arranged on the first protective shell 1, and the second locking buckle 62 is arranged on the auxiliary unlocking member. Referring to FIG. 5 and FIG. 6, the first locking buckle 61 and the second locking buckle 62 are interlocked to each other when the auxiliary unlocking member is in an initial locking position, however, the first locking buckle 61 and the second locking buckle 62 are separated from each other when the auxiliary unlocking member leaves from the initial locking position. In other words, while adjusting the position of the auxiliary unlocking member along the side-by-side distribution direction of the magnet, it will also indirectly adjust the interlock relationship between the first locking buckle 61 and the second locking buckle 62.

Due to the magnets arranged in the second protective shell 2 are connected to the auxiliary unlocking member, "the second locking buckle 62 is arranged on the auxiliary unlocking member" can not only refer to the second locking buckle 62 being directly installed on the auxiliary unlocking member, but also can refer to the second locking buckle 62 being directly installed on the magnets arranged in the second protective shell 2, so as to connect the auxiliary unlocking member indirectly.

The auxiliary unlocking member will pull the magnets 3 arranged in the first protective shell 1 and the second protective shell 2 to move to a place that the poles of the magnets are opposite distributed with opposite poles and attract each other when the auxiliary unlocking member reaches the initial locking position. At this time, the magnetic force generated by the magnets 3 will achieve the closure and locking of the first protective shell 1 and the second protective shell 2. When the first protective shell 1 and the second protective shell 2 are maintained in a closed and locked state by the magnetic force of magnet 3, the first locking buckle 61 and the second locking buckle 62 are in an interlocked state, which can also maintain the closing effect of the first protective shell 1 and the second protective shell 2. further ensuring the closing effect of the first protective shell 1 and the second protective shell 2. In addition, due to the fact that magnet 3, the first locking buckle 61 and the second locking buckle 62 are all controlled by the auxiliary unlocking member, when the auxiliary unlocking member is moved in the side-by-side distribution direction, the magnetic pole corresponding relationship between the magnets changes accordingly, and the buckle connection relationship between the first locking buckle 61 and the second locking buckle 62 also changes accordingly, which ensures the convenience of unlocking/locking the first protective shell 1 and the second protective shell 2.

Generally, in the embodiments provided above, a connection direction of the first locking buckle 61 and the second locking buckle 62 is the same as an opening and closing direction of the first protective shell 1 and the second protective shell. For example, if the first protective shell 1 and the second protective shell 2 open and close in an upward and downward direction, the first locking buckle 61 and the second locking buckle 62 are connected together in the upward and downward direction, which can better maintain the locked state of the first protective shell 1 and the second protective shell 2.

In summary, the storage device provided in this application can be used for packaging and protecting objects to be stored, such as the carphone charging compartment. The storage device is provided with a locking member and an auxiliary unlocking member between the first protective shell 1 and the second protective shell 2; the locking member can provide locking and unlocking functions to the first protective shell 1 and the second protective shell 2, and the locking force applied by the locking member to the first protective shell 1 and the second protective shell 2 is generally greater than the locking force of the relevant locking structure of the carphone charging compartment. Therefore, the possibility of the storage device being accidentally opened by external force is significantly less than the possibility of the carphone charging compartment being accidentally opened by external force; the auxiliary unlocking member can resist the locking force of the locking member when moving relative to the first protective shell 1 and the second protective shell 2. Therefore, users can adjust the locking force or locked state between the first protective shell 1 and the second protective shell 2 by moving the auxiliary unlocking member, so as to easily and quickly unlock the first protective shell 1 and the second protective shell 2. It can be seen that the storage device has sufficient locking force and good unlocking performance, which meets the requirements of users.

The above provide a detailed description to the storage device of the present application. The above descriptions are merely the detailed embodiments of the present application to explain the principles and the implementation methods, and are only used to help understand the methods and core ideas of the present application. It should be understood that those of ordinary skilled in the art can make modifications or variations in light of the above description, and all such modifications and variations should fall within the scope of the appended claims of the present application.

The invention claimed is:

1. A storage device, comprising:

a first protective shell (1) and a second protective shell (2) for enclosing a peripheral side of an object that needs to be stored; and a locking member and an auxiliary unlocking member, arranged between the first protective shell (1) and the second protective shell (2);

wherein the auxiliary unlocking member is configured to move along a shell surface of the first protective shell (1) or move towards the inside and outside of the first protective shell (1) to resist a locking force of the locking member;

wherein the locking member comprises a plurality of magnets (3);

all the magnets (3) are arranged in the first protective shell (1) and the second protective shell (2);

the magnets (3) arranged in the first protective shell (1) are side-by-side distributed and have alternating magnetic poles;

the magnets (3) arranged in the second protective shell (2) are side-by-side distributed and have alternating magnetic poles;

at least a portion of the magnets (3) arranged in the first protective shell (1) are paired with at least a portion of the magnets (3) arranged in the second protective shell (2);

the auxiliary unlocking member is connected to and is able to drive all the magnets (3) arranged in the second protective shell (2) to slide along a side-by-side distributed direction at least a distance of a single said magnet (3);

wherein the auxiliary unlocking member comprises a sliding block (4) and an elastic reset member (8);

the elastic reset member (8) is arranged between the sliding block (4) and the second protective shell (2), and is used to drive the sliding block (4) to move so that multiple magnets (3) will attract each other.

2. The storage device according to claim 1, wherein:

the side-by-side distributed direction is within a shell surface of the second protective shell (2).

3. The storage device according to claim 1, wherein:

two adjacent ends of any pair of the magnets (3) are adjacent and separated from each other.

4. The storage device according to claim 1, wherein:

a maximum movement distance of the auxiliary unlocking member is equal to the size on the side-by-side distributed direction of a single said magnet (3);

two ends of a range of the movement distance of the auxiliary unlocking member correspond to multiple pairs of said magnets (3) attracting each other and multiple pairs of said magnets (3) repelling each other respectively.

5. The storage device according to claim 1, wherein:

all the magnets (3) arranged in the second protective shell (2) are integrated into a second iron sheet (5);

the auxiliary unlocking member is connected to the second iron sheet (5).

6. The storage device according to claim 1, wherein:

the first protective shell (1) and the second protective shell (2) are assembled to form a protective case;

the locking member and one end of the auxiliary unlocking member are both encapsulated in the protective case, and the other end of the auxiliary unlocking member extends out of the protective case.

7. The storage device according to claim 1, wherein:

the first protective shell (1) is provided with a first locking buckle (61), and the auxiliary unlocking member is provided with a second locking buckle (62);

a connection direction of the first locking buckle (61) and the second locking buckle (62) is the same as an opening and closing direction of the first protective shell (1) and the second protective shell (2);

the first locking buckle (61) and the second locking buckle (62) are connected to each other when the auxiliary unlocking member is in an initial locking position, and are separated from each other when the auxiliary unlocking member leaves from the initial locking position;

the magnet (3) of the first protective shell (1) and the magnet (3) of the second protective shell (2) attract each other with opposite poles when the auxiliary unlocking member is in the initial locking position.

* * * * *